United States Patent
Konno et al.

(10) Patent No.: US 6,859,246 B2
(45) Date of Patent: Feb. 22, 2005

(54) OCB TYPE LIQUID CRYSTAL DISPLAY HAVING TRANSITION NUCLEUS AREA FROM SPLAY ALIGNMENT TO BEND ALIGNMENT

(75) Inventors: Takayuki Konno, Tokyo (JP); Osamu Sukegawa, Tokyo (JP); Masayoshi Suzuki, Tokyo (JP); Makoto Watanabe, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 184 days.

(21) Appl. No.: 10/173,922

(22) Filed: Jun. 19, 2002

(65) Prior Publication Data

US 2003/0020857 A1 Jan. 30, 2003

(30) Foreign Application Priority Data

Jun. 20, 2001 (JP) ........................................ 2001-186355

(51) Int. Cl.[7] ..................... G02F 1/1337; G02F 1/139
(52) U.S. Cl. ..................... 349/128; 349/33; 349/110; 349/129; 349/177
(58) Field of Search ........................ 349/33, 124, 128, 349/129, 136, 177, 187, 110, 143; 345/87

(56) References Cited

U.S. PATENT DOCUMENTS 6,069,620 A 5/2000 Nakamura et al.
6,707,520 B2 * 3/2004 Park et al. ................. 349/129

FOREIGN PATENT DOCUMENTS

| JP | 9-185037 | 7/1997 |
| JP | 9-218411 | 8/1997 |
| JP | 10-20284 | 1/1998 |
| JP | 10-142638 | 5/1998 |
| JP | 2000-321588 | 11/2000 |
| JP | 2000-330141 | 11/2000 |

OTHER PUBLICATIONS

S. Chandrasekhar: "Summary of Equations of the Continuum Theory," Liquid Crystals, 1992, pp. 97–98, Cambridge University Press.

* cited by examiner

Primary Examiner—Toan Ton
Assistant Examiner—Tai Duong
(74) Attorney, Agent, or Firm—Foley & Lardner LLP

(57) ABSTRACT

An OCB type liquid crystal display having first and second substrates opposed to each other via a liquid crystal layer such that rubbing directions of the first and second substrates become parallel to each other, a plurality of pixel electrodes which correspond to respective pixels, and a common electrode formed on the second substrate which receives a reference voltage commonly to a plurality of the pixels. A first transition nucleus area is formed in the first substrate layer and has a plurality of continuous slant surfaces having a saw-tooth cross sectional profile, and a second transition nucleus area is formed in the second substrate and has a plurality of continuous slant surfaces having a saw-tooth cross sectional profile. The slant surfaces in the first and second transition nucleus areas oppose to each other and slope toward mutually opposite angular directions.

15 Claims, 11 Drawing Sheets

PHOTO RESIST
(SPIN COATING)

EXPOSURE &
DEVELOPMENT
(GRADATION IN
SLANT PORTIONS)

ITO SPUTTERING

PHOTO RESIST
(SPIN COATING)

EXPOSURE &
DEVELOPMENT

ITO ETCHING

PHOTO RESIST
REMOVAL

INTERLAYER
INSULATING FILM
(SPUTTER OR CVD)

PHOTO RESIST

EXPOSURE &
DEVELOPMENT

CONTACT HOLE
ETCHING

PHOTO RESIST
REMOVAL

ITO SPUTTERING

PHOTO RESIST

EXPOSURE & DEVELOPMENT

ITO ETCHING

PHOTO RESIST REMOVAL

PHOTO RESIST (SPIN COATING)

EXPOSURE & DEVELOPMENT (GRADATION IN SLANT PORTIONS)

OCB TYPE LIQUID CRYSTAL DISPLAY HAVING TRANSITION NUCLEUS AREA FROM SPLAY ALIGNMENT TO BEND ALIGNMENT

FIELD OF THE INVENTION

The present invention relates generally to an Optically Compensated Birefringence (OCB) type liquid crystal display, and more particularly to an OCB type liquid crystal display in which transition of liquid crystal molecules from splay alignment to bend alignment can be made easily by a low transition voltage and without deteriorating display quality.

BACKGROUND OF THE INVENTION

A twisted nematic (TN) system is widely used in a liquid crystal display at present. The liquid crystal display of the TN system has a high image display contrast, but has a problem that the viewing angle dependence is large. In order to improve viewing angle characteristics of the TN type liquid crystal display, various methods have been proposed including a pixel domain division technology. However, another problem that the liquid crystal display of the TN system has a low response speed is not yet resolved. That is, a response speed of the liquid crystal display which uses nematic type liquid crystal is generally low, and a response time between gray scales becomes approximately 100 milliseconds (ms) at its maximum, so that it was impossible to realize a response time of 16.7 ms which is required for displaying a high speed moving picture. Therefore, a display system is required which is suitable for a liquid crystal display capable of displaying a moving picture and which has a wide viewing angle and a high response speed.

As generally known, an OCB type liquid crystal display has a wide viewing angle and a high response speed. A liquid crystal cell used in the OCB type liquid crystal display has bend alignment, and is also called a π-cell. It is also known that the π-cell has a high response speed.

FIG. 13 shows an example of a basic structure of an OCB type liquid crystal display. The OCB type liquid crystal display of FIG. 13 has an active matrix substrate 26 and an opposing side substrate 27 which are opposed to each other via a gap of a predetermined width such that rubbing directions of the active matrix substrate 26 and the opposing side substrate 27 become parallel to each other. Between the active matrix substrate 26 and the opposing side substrate 27, there is disposed a liquid crystal layer 25 having a bend alignment condition. The liquid crystal layer 25 put between the active matrix substrate 26 and the opposing side substrate 27 is also put between negative birefringence compensation films 28 composed by using discotic liquid crystal that is optically negative and that has a structure in which an inclination of major axis varies within the film. On both outsides of the negative birefringence compensation films 28, there are further disposed a pair of polarizer films 29. Because of the structure thereof, the bend alignment always has self compensating characteristics in the rubbing direction, and shows an optically symmetrical characteristics. In the bend alignment, variations in alignment of liquid crystal molecules becomes maximum in the optical axis, that is, within the surface which is parallel to the alignment direction of liquid crystal molecules at the interface and which is perpendicular to the substrates. Therefore, in case the bend alignment structure is sandwiched between a pair of polarizer films having mutually orthogonal polarizing directions, birefringence becomes maximum when the direction of the optical axis is disposed at an angle of 45 degrees with respect to the transmission axes of the polarizer films. When the rubbing direction is fixed to the horizontal direction, each of the transmission axes of the two polarizer films 29 is disposed at an angle of 45 degrees.

As methods of driving the OCB type liquid crystal display, there are two methods, i.e., a normally black driving method in which black is displayed on the low voltage side and a normally white driving method in which black is displayed on the high voltage side. In the normally black driving method, birefringence to be compensated is relatively large and light leakage caused by wavelength dispersion becomes large. Therefore, in the normally black driving method, it is difficult to obtain sufficiently large image contrast. Thus, such problem is solved by using the normally white driving method in which two negative Birefringence compensation films are used as shown in FIG. 13. That is, on the high voltage side, most of the liquid crystal molecules except those located near the interfaces are aligned vertically. Remained birefringence at both interfaces is compensated respectively by using two negative birefringence compensating films, and thereby wide viewing angle characteristics are obtained.

While the OCB type liquid crystal display has superior characteristics such as wide viewing angle characteristics and a high response speed, the OCB type liquid crystal display has a large problem to be solved. The bend alignment cell which is used in the OCB type liquid crystal display has splay alignment in the initial alignment condition. It is necessary to change the alignment condition of the liquid crystal molecules of all the pixels from the splay alignment to the bend alignment when a power source is turned on. Also, during a display operation, it is necessary to continuously apply a voltage equal to or larger than the critical voltage Vc in which bend alignment becomes more stable than splay alignment.

The critical voltage Vc is obtained by calculating variations of Gibbs energy in the splay alignment and in the bend alignment with respect to applied voltages, from various parameters such as matter physics parameters of liquid crystal materials, a gap of liquid crystal display panel, a pretilt angle and the like, and by comparing Gibbs energy between both alignments. Liquid crystal molecules having smaller Gibbs energy are more stable than those having larger Gibbs energy. Therefore, it is preferable that relationships between Gibbs energy and applied voltages are plotted in a graph in which an ordinate designates Gibbs energy and an abscissa designates applied voltages. From such graph, it is possible to read a voltage value at the intersection between Gibbs energy curves to obtain the critical voltage Vc.

FIG. 14 shows an example of calculation of Gibbs energy. In FIG. 14, an abscissa designates applied voltages and an ordinate designates Gibbs energy. Also, in FIG. 14, a relationship in bend alignment is shown by a solid line curve, and a relationship in splay alignment is shown by a dotted line curve. An applied voltage at which Gibbs energy in splay alignment and Gibbs energy in bend alignment become equal to each other is determined to be the critical voltage Vc. Theoretically, when a voltage larger than the critical voltage Vc is applied to a liquid crystal display panel, the bend alignment becomes more stable than the splay alignment. However, in order to cause transition from splay alignment to bend alignment, it is necessary to apply a voltage which is considerably higher than the critical voltage Vc. When a voltage of 20 volts or so is applied to a liquid crystal display panel, transition from the splay alignment to bend alignment can be done in a short time of several seconds or shorter. However, when based on the premise that a liquid crystal display is an active matrix type liquid crystal display, it is only possible to apply approximately 5 volts at the maximum because of the limitation by the withstanding voltage of a thin film transistor. It has been found by experiment that, when 5 volts are applied, transition from splay alignment to bend alignment does not occur or hardly occur. In order to cause initial transition to occur even at 5 volts or so, various methods are proposed in which transition nuclei as sources of the transition are produced to prompt the initial transition.

Technologies for providing nucleus generating means in pixel areas are as follows.

In Japanese patent laid-open publication No. 09-218411, micro-pearls are disposed between substrates of a liquid crystal display panel and used as nucleus generating means as well as spacers for maintaining the gap between the substrates. The micro-pearls have a characteristic that, at the surface of each micro-pearl, liquid crystal molecules are aligned parallel to the surface. Therefore, it is possible to stably maintain bend alignment condition while using a conventional fabrication process. However, in this method, it is necessary to disperse many micro-pearls uniformly in the liquid crystal display panel to maintain bend alignment stably. Also, in the periphery of each of the micro-pearls which function as nucleus generating means, alignment of liquid crystal molecules is distorted and, therefore, light leakage occurs when a black image is displayed.

In Japanese patent laid-open publication No. 10-142638, micro-pearls are used each of which has a diameter smaller than a gap between substrates of a liquid crystal display panel and which have a characteristic that, at the surface of each micro-pearl, liquid crystal molecules are aligned perpendicular to the surface. Thereby, liquid crystal molecules above each micro-pearl are aligned perpendicularly to the substrate and quasi-hybrid alignment is produced, so that transition from splay alignment to bend alignment is prompted to occur. However, in this liquid crystal display panel, liquid crystal molecules are aligned perpendicularly to the surface of each of the micro-pearls as nucleus generating means. Therefore, liquid crystal molecules on the sides of each micro-pearl are aligned parallel to the substrates, and light leakage becomes large. Also, in addition to dispersing gap members between the substrates, it is necessary to disperse the micro-pearls which become nucleus generating means and each of which has a smaller diameter than the gap between the substrates. Therefore, it is difficult to stably fix the micro-pearls each having a smaller diameter than the gap between the substrates.

In Japanese patent laid-open publication No. 10-020284, a convex portion having a taper shape is formed on each pixel electrode, and thereby forming an area where an electric field strength is partially high to provide a nucleus generating means. The convex portion is made of a material which has a dielectric constant larger than that of a liquid crystal material or is made of a conductive material. In this publication, a method is also described in which there is provided an area of high pretilt angle in each pixel area and liquid crystal molecules are partially pretilted at relatively high angles, thereby a nucleus generating means is provided. However, these methods have a problem that alignment of liquid crystal molecules is distorted in the periphery of the nucleus generating means and therefore light leakage occurs when a black image is displayed. In addition to such problem, these methods also have problems that process steps in manufacturing the liquid crystal display increase because of the formation of the nucleus generating means, that control of the taper shape is difficult, and the like.

As methods of providing nucleus generating means outside pixel areas, there are known the following methods.

In Japanese patent laid-open publication No. 2000-330141, a hybrid type alignment film comprising a horizontal alignment component and a vertical alignment component is used to obtain a high pretilt angle such that liquid crystal molecules have bend alignment when no voltage is applied to a liquid crystal display panel. Then, ultraviolet rays are applied only to a display area to obtain a low pretilt angle such that a splay alignment is obtained when no voltage is applied to the liquid crystal display panel, thereby forming the nucleus generating means in an area other than pixel areas. However, it was difficult to control and maintain a high pretilt angle uniformly and stably by using the hybrid type alignment film.

In Japanese patent laid-open publication No. 2000-321588, a liquid crystal display is described in which a space between pixel electrodes is narrowed, and a high voltage is applied to a common electrode. Thereby, a strong electric field is produced not only between the common electrode and the pixel electrodes, but also between the common electrode and scanning signal and image signal electrodes located between the pixel electrodes, so that transition from splay alignment to bend alignment can be surely done throughout the whole display area. This method is effective as a means for initial transition from splay alignment to bend alignment. However, since the high voltage is applied to the common electrode, it is impossible to stably maintain the bend alignment during a display operation.

In Japanese patent publication No. 3074640, a power-on reset signal is supplied to scanning signal electrodes from a driver system side, and thereby a strong electric field is produced between each of the scanning signal electrodes and a common electrode. At the same time, a voltage higher than the critical voltage Vc is applied between each pixel electrode and the common electrode, thereby causing transition from splay alignment to bend alignment in a short time. Also, during a display operation, similar operation is performed at predetermined time intervals to maintain bend alignment. Therefore, in this method, an initial transition can be effectively performed and, also, reset operation is performed at predetermined time intervals during a display operation to stably maintain bend alignment. However, in this method, it is necessary to write a black level image into a liquid crystal display panel by interrupting a display operation. Therefore, there is a problem that a transmittance of the liquid crystal display panel is substantially deteriorated.

SUMMARY OF THE INVENTION

Therefore, it is an object of the present invention to provide an OCB type liquid crystal display in which a voltage required for switching from splay alignment to bend alignment and for maintaining the bend alignment can be decreased, to provide a method of driving such OCB type liquid crystal display, and to provide a manufacturing method thereof.

It is another object of the present invention to provide an OCB type liquid crystal display in which deterioration of light transmittance can be avoided, to provide a method of driving such OCB type liquid crystal display, and to provide a manufacturing method thereof.

It is still another object of the present invention to provide an OCB type liquid crystal display in which alignment disturbance of liquid crystal molecules can be avoided and which has high image display quality, to provide a method of driving such OCB type liquid crystal display, and to provide a manufacturing method thereof.

It is still another object of the present invention to provide an OCB type liquid crystal display in which liquid crystal molecules can aligned uniformly and effectively throughout a display area, to provide a method of driving such OCB type liquid crystal display, and to provide a manufacturing method thereof.

It is still another object of the present invention to provide an OCB type liquid crystal display in which pretilt angle of alignment layers can be small and costs of materials and the like can be reduced, to provide a method of driving such OCB type liquid crystal display, and to provide a manufacturing method thereof.

It is still another object of the present invention to obviate the disadvantages of the conventional OCB type liquid crystal displays.

According to an aspect of the present invention, there is provided a liquid crystal display comprising: first and second substrates which are opposed to each other via a liquid crystal layer interposed therebetween, wherein rubbing directions of the first and second substrates being parallel to each other; a plurality of pixel electrodes which correspond to respective pixels; a common electrode formed on the second substrate which receives a reference voltage commonly to a plurality of the pixels; a first transition nucleus area which is formed on the surface of the first substrate on the side of the liquid crystal layer and which comprises a plurality of continuous slant surfaces having a saw-tooth cross sectional profile; and a second transition nucleus area which is formed on the surface of the second substrate on the side of the liquid crystal layer and which comprises a plurality of continuous slant surfaces having a saw-tooth cross sectional profile; wherein the slant surfaces in the first transition nucleus area and the slant surfaces in the second transition nucleus areas oppose to each other and slope toward mutually opposite angular directions.

In this case, it is preferable that a hypothetical plane extended from the slant surface of the transition nucleus area of the first substrate and a hypothetical plane extended from the slant surface of the transition nucleus area of the second substrate intersect within the liquid crystal layer.

It is also preferable that the first transition nucleus area is formed in a non-display area other than the pixel areas of the first substrate.

It is further preferable that the non-display area is an area where the scanning signal line and/or the image signal line are formed.

It is advantageous that a light shield layer is formed in an area of the second substrate opposing to the non-display area, thereby the non-display area is covered by the light shield layer.

It is also advantageous that the second transition nucleus area formed on the side of the second substrate is formed at approximately the same area as that corresponding to the first transition nucleus area formed on the side of the second substrate.

It is further advantageous that the slant surfaces of the first transition nucleus area and the slant surfaces of the second transition nucleus area are formed in a uniform direction throughout the whole display area.

It is preferable that, because of the slant surfaces of the first transition nucleus area and of the second transition nucleus area, liquid crystal molecules in the transition nucleus areas have substantially high pretilt angle, and, even in a condition no voltage difference exists between the pixel electrodes and the common electrode, liquid crystal molecules of the liquid crystal layer in the transition nucleus areas have bend alignment.

It is also preferable that an angle between the slant surfaces of the first transition nucleus area and the first substrate and an angle between the slant surfaces of the second transition nucleus area and the second substrate are respectively equal to or larger than 45 degrees, and a ratio of elastic constants k33/k11 between an elastic constant of bend alignment and an elastic constant of splay alignment is equal to or smaller than 1 (one).

It is further preferable that an angle between the slant surfaces of the first transition nucleus area and the first substrate and an angle between the slant surfaces of the second transition nucleus area and the second substrate are respectively equal to or larger than 60 degrees.

It is advantageous that the slopes of the slant surfaces of the first transition nucleus area and the second transition nucleus area substantially coincides with the alignment direction of liquid crystal molecules at respective interfaces between the first substrate and the liquid crystal layer and between the second substrate and the liquid crystal layer.

It is also advantageous that the liquid crystal display further comprises: a plurality of scanning signal lines disposed on the first substrate; a plurality of image signal lines which are disposed on the first substrate and which intersect the scanning signal lines; and a plurality of thin film transistors which are formed in the proximity of respective intersections between the scanning signal lines and the image signal lines; wherein each of the plurality of pixel electrodes is formed in correspondence with one of areas surrounded by the scanning signal lines and the image signal lines and is coupled with respective one of the thin film transistors.

According to another aspect of the present invention, there is provided a method of manufacturing a liquid crystal display having first and second substrates which are opposed to each other via a liquid crystal layer interposed therebetween; a plurality of pixel electrodes which correspond to respective pixels, a common electrode formed on the second substrate which receives a reference potential commonly to a plurality of the pixels, a first transition nucleus area which is formed on the surface of the first substrate on the side of the liquid crystal layer and which comprises a plurality of continuous slant surfaces having a saw-tooth cross sectional profile, and a second transition nucleus area which is formed on the surface of the second substrate on the side of the liquid crystal layer and which comprises a plurality of continuous slant surfaces having a saw-tooth cross sectional profile, said method including: applying photosensitive resin on the first or second substrate; and performing an exposure and development process by using a mask having gradation portions each of which has a light transmittance that varies continuously to form the slant surfaces of the first or second transition nucleus area.

According to still another aspect of the present invention, there is provided a method of manufacturing a liquid crystal display having first and second substrates which are opposed to each other via a liquid crystal layer interposed therebetween; a plurality of pixel electrodes which correspond to respective pixels, a common electrode formed on the second substrate which receives a reference potential commonly to a plurality of the pixels, a first transition nucleus area which is formed on the surface of the first substrate on the side of the liquid crystal layer and which comprises a plurality of continuous slant surfaces having a saw-tooth cross sectional profile, and a second transition nucleus area which is formed on the surface of the second substrate on the side of the liquid crystal layer and which comprises a plurality of continuous slant surfaces having a saw-tooth cross sectional profile, said method including: applying photosensitive resin on the first or second substrate; and performing an exposure and development process by increasing/decreasing an exposure strength, while transporting a mask having a slit step-wise to form the slant surfaces of the first or second transition nucleus areas.

According to still another aspect of the present invention, there is provided a method of driving a liquid crystal display having first and second substrates which are opposed to each other via a liquid crystal layer interposed therebetween, a plurality of pixel electrodes which correspond to respective pixels, and a common electrode formed on the second substrate which receives a reference voltage commonly to a plurality of the pixels, the method comprising: providing a transition nucleus area in a non-display area in the periphery of the pixel electrodes, and making the liquid crystal layer in the transition nucleus area bend aligned in a condition no voltage is applied between the pixel electrodes and the common electrode; and switching the liquid crystal layer in the display area of each pixel from a splay alignment condition to a bend alignment condition, by applying a voltage between the pixel electrode in the pixel and the common electrode.

In this case, it is preferable that the transition nucleus area comprises a first transition nucleus area which is formed on the surface of the first substrate on the side of the liquid crystal layer and which comprises a plurality of continuous slant surfaces having a saw-tooth cross sectional profile, and a second transition nucleus area which is formed on the surface of the second substrate on the side of the liquid crystal layer and which comprises a plurality of continuous slant surfaces having a saw-tooth cross sectional profile; and that the slant surfaces in the first transition nucleus area and the slant surfaces in the second transition nucleus area oppose to each other and slope toward mutually opposite angular directions.

It is also preferable that an angle between the slant surfaces of the first transition nucleus area and the first substrate and an angle between the slant surfaces of the second transition nucleus area and the second substrate are respectively equal to or larger than 45 degrees, and a ratio of elastic constants k33/k11 between an elastic constant of bend alignment and an elastic constant of splay alignment is equal to or smaller than 1 (one).

It is further preferable that an angle between the slant surfaces of the first transition nucleus area and the first substrate and an angle between the slant surfaces of the second transition nucleus area and the second substrate are respectively equal to or larger than 60 degrees.

In the above-mentioned liquid crystal display according to the first aspect of the present invention, slant surfaces of transition nucleus area are formed on both substrates opposing to each other such that the slant surfaces on both substrates opposing to each other incline toward mutually opposite angular directions, such that, for example, the slant surfaces become approximately symmetrical with each other. Therefore, a portion of a liquid crystal layer located between the transition nucleus areas is bend aligned, and when a voltage is applied between both substrates, transition occurs easily from splay alignment to bend alignment.

Also, hypothetical lines extended from the slant surfaces in the transition nucleus areas of both substrates may preferably intersect within the liquid crystal layer, and this corresponds to the condition in which the slant surfaces are formed as shown in FIG. 15. In such condition, a portion of liquid crystal layer located between the transition nucleus areas becomes a bend alignment condition, and when a voltage is applied between both substrates, transition occurs easily from splay alignment to bend alignment.

When the slant surfaces of the transition nucleus areas are formed in areas other than pixel electrode areas, disturbance of alignment of liquid crystal molecules does not occur in a display area, and, therefore, deterioration of light transmission does not occur easily.

The transition nucleus areas may be formed at locations corresponding to areas where the scanning signal electrodes/ the image signal electrodes are formed. Thereby, portions interposed between the transition nucleus areas are covered by a black matrix portion, and it becomes possible to improve display quality of the liquid crystal display.

The transition nucleus areas may preferably be formed at locations which approximately oppose to each other. Thereby, disturbance of alignment of liquid crystal molecules between the transition nucleus areas is decreased and display quality of the liquid crystal display can be improved.

In case the slant surfaces of the transition nucleus areas are inclined toward uniform directions throughout the whole display area, it is possible to unify alignment directions of liquid crystal molecules of all pixels, and it becomes possible to effectively and uniformly align liquid crystal layer of the whole display area.

It is possible to make the liquid crystal molecules in the transition nucleus areas bend aligned, even in a condition no voltage is applied between both substrates. Thereby, liquid crystal molecules in other portions of the liquid crystal layer which are splay aligned in a condition no voltage is applied are prompted to become bend aligned by the bend alignment condition in the transition nucleus areas when a voltage is applied between both substrates. Therefore, it becomes possible to easily produce and stably maintain the bend alignment condition in the liquid crystal layer even when a relatively low voltage is applied between both substrates.

When the angle between each of the slant surfaces of the transition nucleus areas and the substrate is equal to or larger than 45 degrees and when a liquid crystal material used has a ratio of elastic constants of bend alignment and splay alignment k33/k11 which is equal to or smaller than 1, it is possible to realize bend alignment of the liquid crystal layer in the transition nucleus areas in a condition no voltage is applied between the substrates. Thereby, liquid crystal molecules in other portions of the liquid crystal layer which are splay aligned in a condition no voltage is applied are induced to become bend aligned by the bend alignment condition in the transition nucleus areas, when a voltage is applied between both substrates. Therefore, it becomes possible to easily produce and stably maintain the bend alignment condition in the liquid crystal layer even when a relatively low voltage is applied between both substrates.

Also, when the angle between each of the slant surfaces of the transition nucleus areas and the substrate is equal to or larger than 60 degrees, theoretically in all liquid crystal materials, it is possible to realize bend alignment of the liquid crystal layer in the transition nucleus areas in a condition no voltage is applied between the substrates. The liquid crystal molecules in the transition nucleus areas are bend aligned, even in a condition no voltage is applied between both substrates. Thereby, liquid crystal molecules in other portions of the liquid crystal layer which are splay aligned in a condition no voltage is applied are induced to become bend aligned by the bend alignment condition in the transition nucleus areas, when a voltage is applied between both substrates. Therefore, it becomes possible to easily produce and stably maintain the bend alignment condition in the liquid crystal layer even when a relatively low voltage is applied between both substrates.

Depending on an angle of the slant surface of each transition nucleus area with respect to the substrate, the liquid crystal molecules disposed between the transition nucleus areas become bend aligned. Therefore, even when the pretilt angle of the substrate surface of each of the transition nucleus areas is zero (0) degree, it is possible to maintain bend alignment. Thus, it is possible to use a material having a small pretilt angle in the interface portion with the liquid crystal layer, and it becomes possible to easily select the material from a point of view of costs thereof.

When manufacturing the liquid crystal display according to the present invention, it is possible to perform an exposure and development process by using a mask having gradation portions each of which has a light transmittance that varies continuously. Thereby, it becomes possible to form the slant surfaces of the transition nucleus areas. Therefore, it is possible to provide a liquid crystal display according to the present invention without increasing manufacturing process steps thereof.

Also, it is possible to perform an exposure and development process by increasing/decreasing an exposure light strength, while transporting a mask having slit(s) stepwise. Thereby, it becomes possible to easily form the slant surfaces of the transition nucleus areas. Therefore, it is possible to provide a liquid crystal display according to the present invention without largely increasing manufacturing process steps thereof.

By forming the transition nucleus areas and by making the liquid crystal molecules interposed between the transition nucleus areas bend aligned at the condition no voltage is applied between the substrates, it becomes possible to easily perform transition from splay alignment to bend alignment when a voltage is applied between both substrates. Also, it is possible to easily maintain the bend alignment.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, an explanation will be made on embodiments of the present invention. It should be noted that the embodiments described below are only examples and do not limit the scope of the present invention.

[Embodiment 1]

Figure 1:
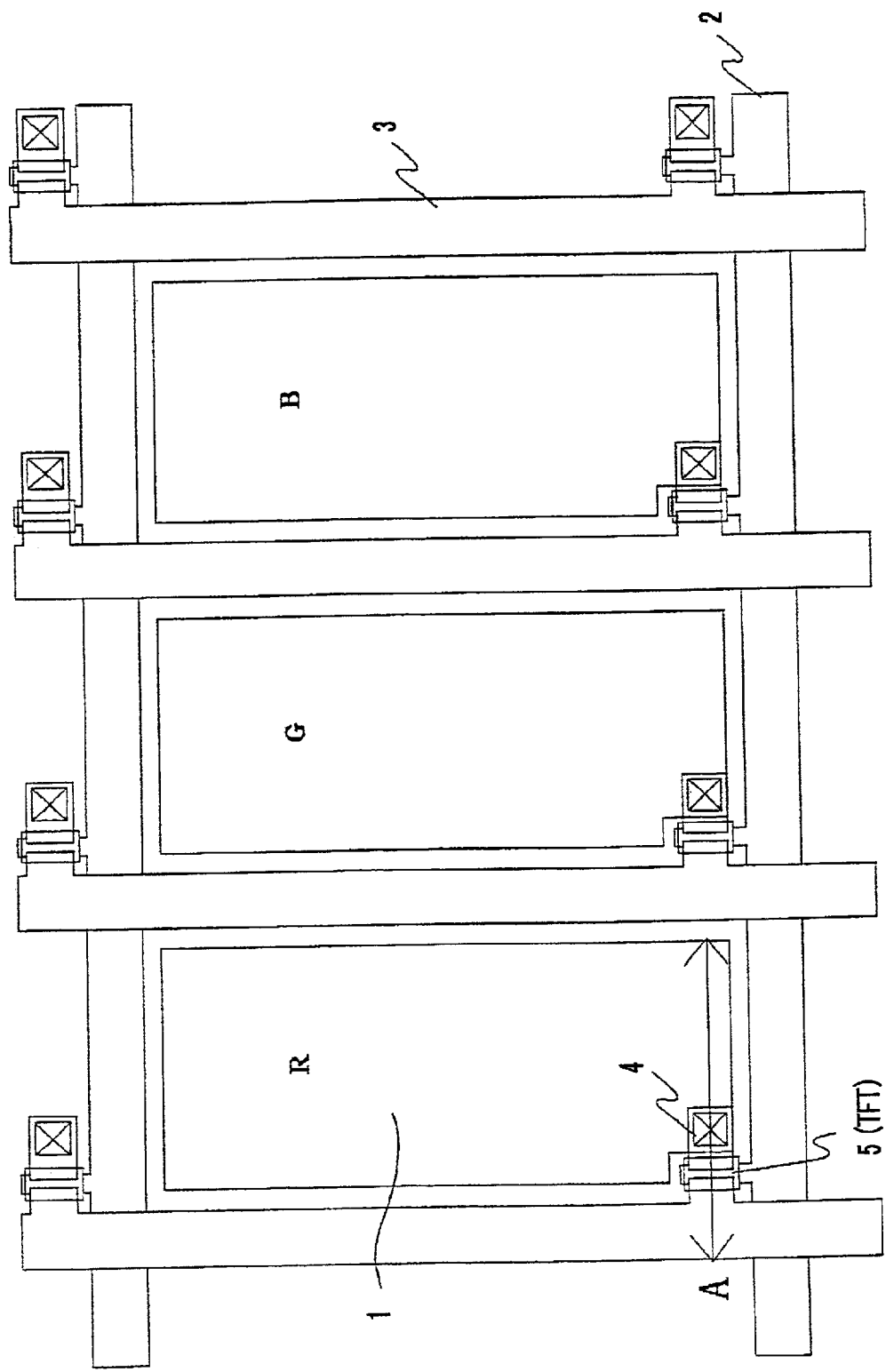
FIG. 1 is a plan view showing pixels formed on an active matrix substrate of an OCB type liquid crystal display according to the present embodiment.

FIG. 1 is a plan view showing pixels formed on an active matrix substrate of an OCB type liquid crystal display according to the present embodiment. As shown in FIG. 1, pixel electrodes 1 are disposed in a matrix on the active matrix substrate. Also, there are disposed gate lines 2 and drain lines 3 which pass along the periphery of the pixel electrodes 1 and which are perpendicular to each other. In the proximity of each of intersections between the gate lines 2 and the drain lines 3, there is disposed a thin film transistor (TFT) 5. A drain electrode of each TFT 5 is coupled with the drain line 3, and a gate electrode of each TFT 5 is coupled with the gate line 2. Also, a source electrode of each TFT 5 is coupled with the pixel electrode 1 via a contact hole 4. By using three sets of the pixel electrodes 1 and the TFT's 5 which perform image display of red (R) color, green (G) color and blue (B) color, respectively, it becomes possible to constitute one pixel for color display.

Figure 2:
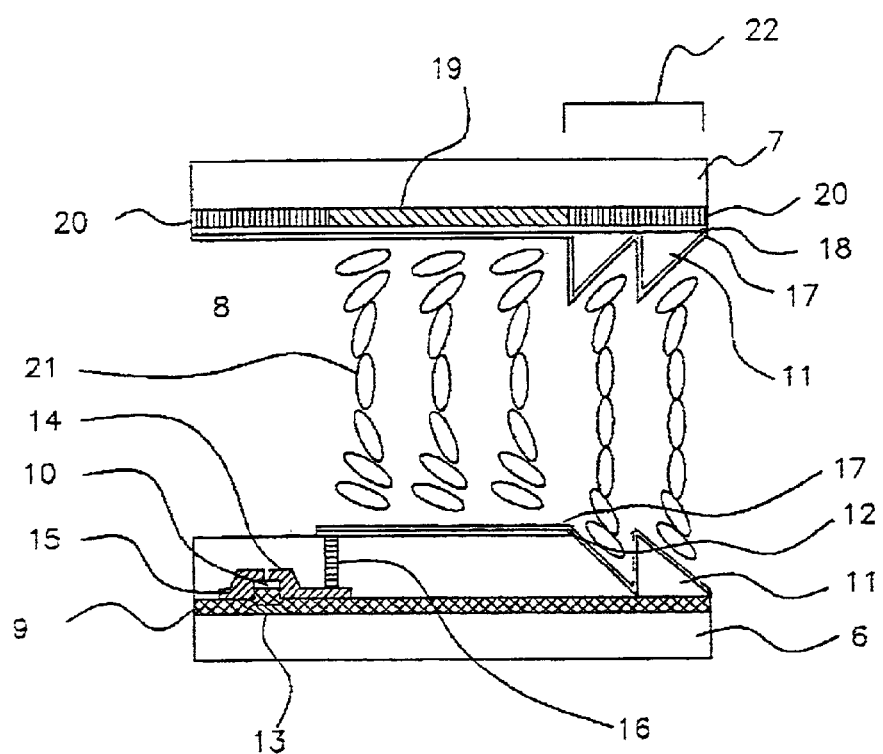
FIG. 2 is a partial schematic cross sectional view of the OCB type liquid crystal display taken along the line A—A in FIG. 1.

FIG. 2 is a partial schematic cross sectional view of the OCB type liquid crystal display taken along the line A—A in FIG. 1. As shown in FIG. 2, the OCB type liquid crystal display according to the present invention comprises a lower side substrate 6, an opposing side substrate 7 which is disposed on the opposite side of the lower side substrate 6 and a liquid crystal layer 8 interposed between the lower side substrate 6 and the opposing side substrate 7. The thickness of the liquid crystal layer 8 is 5–6 μm. On the lower side substrate 6, there are disposed a gate insulating film 9, a TFT 10, an insulating film 11 and a pixel electrode 12. More particularly, on the lower side substrate 6, there is stacked the gate insulating film 9 which is made of photosensitive acrylic resin. On the gate insulating film 9, the TFT 10 is formed. The TFT 10 has a gate electrode 13 formed on the lower side substrate 6, and a source electrode 14 and a drain electrode 15 which are formed on the gate insulating film 9 covering the gate electrode 13. The gate electrode 13 is electrically coupled with the gate line 2 shown in FIG. 1, and the drain electrode 15 is electrically coupled with the drain line 3 shown in FIG. 1.

On the gate insulating film 9 and the TFT 10, the insulating film 11 is stacked, and the insulating film 11 has a contact hole 16 which reaches the source electrode 14. Also, the pixel electrode 12 is formed to cover the insulating film 11 and the contact hole 16. Therefore, the pixel electrode 12 is electrically coupled with the source electrode 14 of the TFT 10, and functions as an electrode for applying a voltage to the liquid crystal layer 8. Further, it is possible to form an alignment film 17 on the pixel electrode 12 and the like.

The opposing side substrate 7 has an alignment film 17, an insulating film 11, a common electrode 18, a color filter 19 and a light shield film 20 which are stacked on the opposing side substrate 7 in this order from side of the liquid crystal layer 8. The light shield film 20 is formed such that it covers the TFT 10 and the transition nucleus area 22. Although not shown in the drawing, it is also possible to form the light shield film 20 on other location, for example, on the insulating film 11 on the side of the lower side substrate 6. The alignment film 17 is a film for determining the alignment direction of liquid crystal molecules 21 in the liquid crystal layer 8 by rubbing the surface of the alignment film 17. The common electrode 18 functions as an electrode which, together with the pixel electrodes 12, applies a voltage to the liquid crystal layer 8. The color filter 19 is made of transparent resin which is colored red (R), green (G) and blue (B). The light shield film 20 is a black mask which is formed on the side of the opposing side substrate 7 at locations opposing to the TFT 10, the gate line 2 and drain line 3 on the lower side substrate 6, and functions to avoid transmission of light at these areas.

On the insulating films 11 stacked on the lower side substrate 6 and on the opposing side substrate 7, slant surfaces are continuously formed which have saw-tooth like cross sections or profile, in an area other than the areas where the pixel electrodes 12 are formed. Such area where the slant surfaces are formed is hereafter called transition nucleus area 22. At the slant surfaces of the insulating film 11 in the transition nucleus area 22 in each of the opposing side substrate 7 and of the lower side substrate 6, the pretilt angle and alignment direction of the liquid crystal molecules 21 are also determined by various factors. Such factors include, for example, an angle of the slant surface with respect to the substrate, a material of the insulating film 11, a material of the alignment film 17, rubbing direction and the like. When, for example, resin having a small pretilt angle is used as a material of the insulating film 11 and the like, long axes of liquid crystal molecules 21 are aligned approximately parallel to the interface between the insulating film 11 and the liquid crystal layer 8. Therefore, as shown in FIG. 2, in the condition the lower side substrate 6 and the opposing side substrate 7 are opposed to each other, when the slant surfaces of the insulating films 11 opposing to each other incline toward mutually opposite angular directions with respect to a hypothetical plane parallel to the substrates and passing through the liquid crystal layer 8, liquid crystal molecules located between the transition nucleus areas 22 of the lower side substrate 6 and the opposing side substrate 7 are always bend aligned, because the liquid crystal molecules 21 are continuum medium.

Here, a consideration will be described with respect to a slope angle of the surface of the insulating film 11 which is necessary to realize bend alignment as an initial alignment condition. As is known and used widely at present, Oseen, zocher and Frank made an analysis and derived the following formula (1), which shows a free energy density f per unit volume of a deformed liquid crystal material. See "LIQUID CRYSTALS", second edition, S. Chandrasekhar, University Press, Cambridge, 1992.

$$f = \frac{1}{2}k_{11}(\nabla \cdot n)^2 + \frac{1}{2}k_{22}(n \cdot \nabla \times n)^2 + \frac{1}{2}k_{33}(n \times \nabla \times n)^2 \qquad (1)$$

where, $k_{11}$, $k_{22}$ and $k_{33}$ are Oseen-Frank elastic constants corresponding to splay, twist and bend, respectively, and are matter physics values inherent in the liquid crystal material. Also, n is a non-dimensional unit vector which designates an alignment direction of a liquid crystal molecule at any point. When any external force such as an electric field and the like is applied, a term representing the external force is added to the formula (1). Here, an initial alignment condition in which no external force is applied is considered, and, therefore, no reference is made to such external force. By using the formula (1), a condition in which bend alignment becomes more stable than splay alignment in the initial condition is derived.

Figure 3:
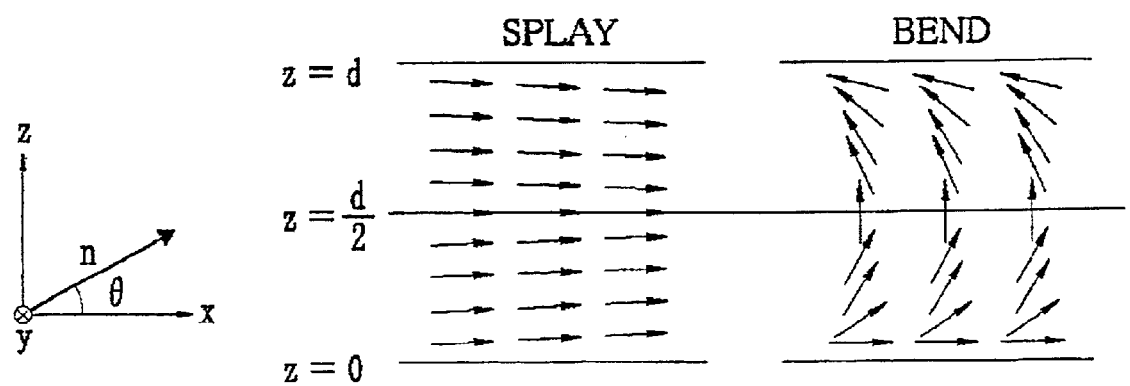
FIG. 3 is a schematic illustration showing ideal splay alignment and bend alignment conditions.

For the sake of simplicity, consideration will be made on ideal splay alignment and bend alignment conditions as shown in FIG. 3. In such case, since no twist component exists, n becomes as follows, when an angle of a liquid crystal molecule from x-axis at a location z is represented by θ, the following relationships are obtained. Here, θ is a function of only z.

$$n = (\cos\theta, 0, \sin\theta), \nabla = \left(\frac{\delta}{\delta x}, \frac{\delta}{\delta x}, \frac{\delta}{\delta z}\right) = \left(0, 0, \frac{\delta}{\delta z}\right)$$

By substituting these relations for the formula (1), the following formula is obtained.

$$f(z) = \frac{1}{2}(k_{11}\cos^2\theta + k_{33}\sin^2\theta)\left(\frac{d\theta}{dz}\right)^2 = \frac{1}{2}g(\theta)\left(\frac{d\theta}{dz}\right)^2 \qquad (2)$$

When the thickness of the liquid crystal layer is represented by using d, a free energy F per unit area becomes as follows.

$$F = \int_0^d f(z)\,dz = \frac{1}{2}\int_0^d g(\theta)\left(\frac{d\theta}{dz}\right)^2 dz$$

From this formula, it can be seen that when F is minimum, an equilibrium condition is obtained. When f satisfies the following formula (3) concerning Euler-Lagrange relation, F becomes minimum.

$$\frac{d}{dz}\left\{\frac{\delta f}{\delta\left(\frac{d\theta}{dz}\right)}\right\} - \frac{\delta f}{\delta\theta} = 0 \tag{3}$$

By substituting f as a functional concerning z, θ, dθ/dz for the formula (3), following relations are obtained.

$$\frac{d}{dz}\left\{g(\theta)\cdot\frac{d\theta}{dz}\right\} - \frac{1}{2}\left(\frac{d\theta}{dz}\right)^2\cdot\frac{dg(\theta)}{d\theta} = 0$$

$$\left\{\frac{dg(\theta)}{d\theta}\cdot\frac{d\theta}{dz}\cdot\frac{d\theta}{dz} + g(\theta)\cdot\frac{d^2\theta}{dz^2}\right\} - \frac{1}{2}\left(\frac{d\theta}{dz}\right)^2\cdot\frac{dg(\theta)}{d\theta} = 0$$

$$\therefore \frac{dg(\theta)}{d\theta}\cdot\left(\frac{d\theta}{dz}\right)^2 + 2g(\theta)\cdot\frac{d^2\theta}{dz^2} = 0$$

By multiplying both sides of the above formula by dθ/dz and transforming the formula, the following relations are obtained.

$$\frac{dg(\theta)}{d\theta}\cdot\frac{d\theta}{dz}\cdot\left(\frac{d\theta}{dz}\right)^2 + 2g(\theta)\cdot\frac{d\theta}{dz}\cdot\frac{d^2\theta}{dz^2} = 0 \tag{4}$$

$$\frac{dg(\theta)}{d\theta}\cdot\left(\frac{d\theta}{dz}\right)^2 + g(\theta)\left\{2\frac{d\theta}{dz}\cdot\frac{d^2\theta}{dz^2}\right\} = 0$$

$$\frac{dg(\theta)}{d\theta}\cdot\left(\frac{d\theta}{dz}\right)^2 + g(\theta)\left\{\frac{d}{dz}\left(\frac{d\theta}{dz}\right)^2\right\} = 0$$

$$\frac{d}{dz}\left\{g(\theta)\left(\frac{d\theta}{dz}\right)^2\right\} = 0$$

$$\therefore f(z) = \frac{1}{2}g(\theta)\left(\frac{d\theta}{dz}\right)^2 = C = \text{const.}$$

Therefore, it is derived that the free energy density per unit volume is always constant within the layer. By using this result, free energy density f per unit volume of each of splay alignment and bend alignment can be derived. The formula (4) is transformed into the following formula.

$$\sqrt{2C}\,dz = \sqrt{g(\theta)}|d\theta|$$

Both sides of this formula are integrated. Assuming that a pretilt angle is $\theta_0$, boundary conditions of splay alignment and bend alignment respectively become as follows.

splay: $\theta(z=0) = \theta_0,\ \theta\left(z=\frac{d}{2}\right) = 0,\ \theta(z=d) = -\theta_0$ bend: $\theta(z=0) = \theta_0,\ \theta\left(z=\frac{d}{2}\right) = \frac{\pi}{2},\ \theta(z=d) = \pi - \theta_0$ In splay alignment, by using symmetry at z=d/2, and $\cos(-\theta)=\cos\theta$, $\sin(-\theta)=-\sin\theta$, the following relation is obtained.

$$\sqrt{2C}\int_0^d dz = 2\int_0^{\theta_0}\sqrt{g(\theta)}\,d\theta$$

$$C = f_{SPLAY} = \frac{2}{d^2}\left\{\int_0^{\theta_0}\sqrt{g(\theta)}\,d\theta\right\}^2$$

Similarly, in bend alignment condition, by using symmetry at z=d/2, and $\cos(\pi-\theta)=-\cos\theta$, $\sin(\pi-\theta)=\sin\theta$, the following relation is obtained.

$$\sqrt{2C}\int_0^d dz = 2\int_{\theta_0}^{\frac{\pi}{2}}\sqrt{g(\theta)}\,d\theta$$

The condition that bend alignment becomes more stable than splay alignment is $f_{SPLAY} > f_{BEND}$, and therefore the following formula (7) is obtained.

$$\therefore 2\int_0^{\theta_0}\sqrt{\cos^2\theta + k\sin^2\theta}\,d\theta > \int_0^{\frac{\pi}{2}}\sqrt{\cos^2\theta + k\sin^2\theta}\,d\theta\ (\kappa = k_{33}/k_{11}) \tag{7}$$

Figure 4:
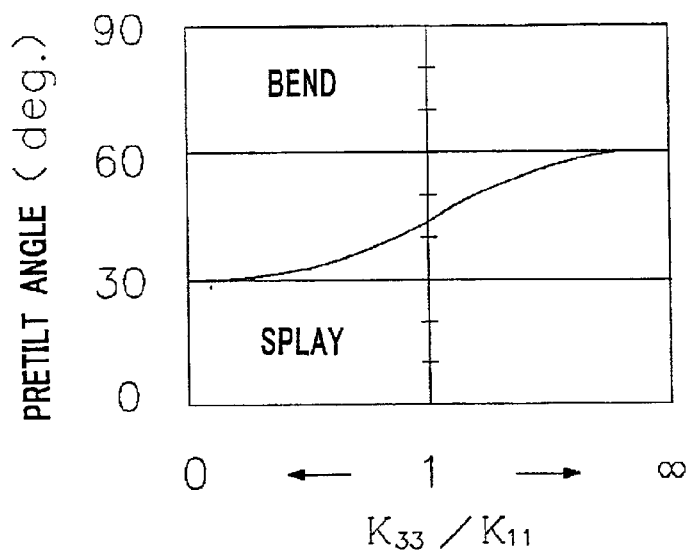
FIG. 4 is a graph showing a relation between a ratio of elastic constants in abscissa and a pretilt angle in ordinate.

With respect to the formula (7) obtained from the above-mentioned elastic continuum theory, FIG. 4 shows a relation between a ratio of elastic constants κ (=$k_{33}/k_{11}$) in abscissa and a pretilt angle $\theta_0$ in ordinate. The abscissa has a logarithmic scale. The boundary curve depicted in FIG. 4 shows that when κ=1, $\theta_0$ becomes 45 degrees, when κ approaches infinity, $\theta_0$ approaches 60 degrees, and when κ approaches zero (0), $\theta_0$ approaches 30 degrees. When a liquid crystal material is used in which κ<1, the angle of each of the slant surfaces of the insulating film 11 in the transition nucleus areas should be equal to or larger than 45 degrees. In this case, if the angle of the slant surface is equal to or larger than 60 degrees, the initial alignment condition always becomes bend aligned. A pretilt angle reproducibly and stably obtained by using rubbing methods which are widely used industrially is approximately 10 degrees at maximum. However, by using the slant profile according to the present invention, it is possible to realize a high pretilt angle which can not be realized only by using rubbing methods, and it is possible to realize bend alignment in the initial alignment condition.

Figure 5:
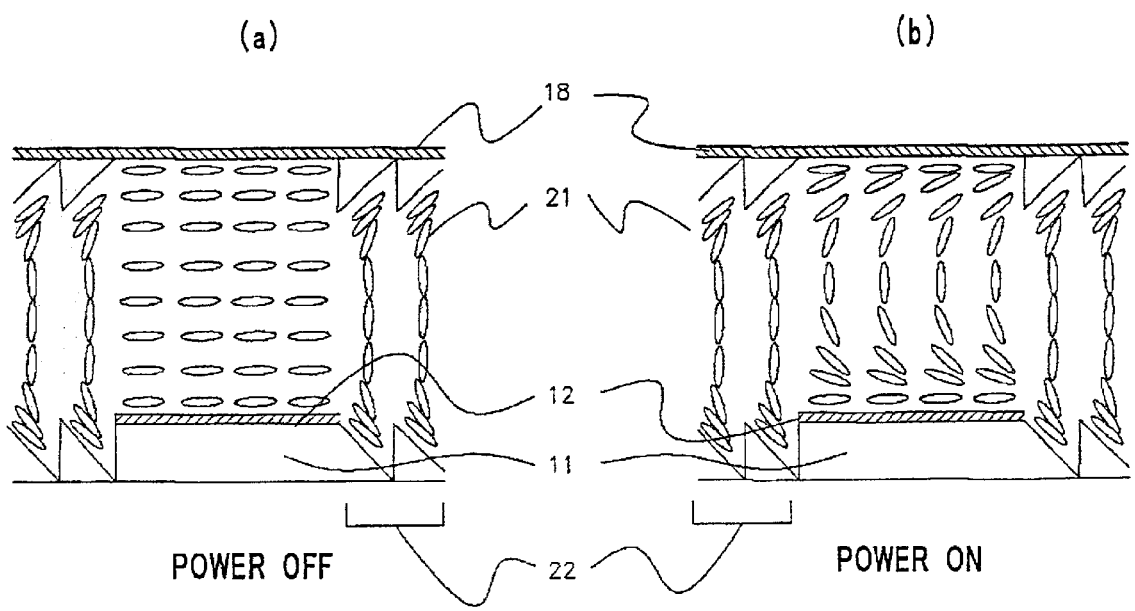
FIG. 5 includes cross sectional views obtained by simplifying the cross sectional view of the OCB type liquid crystal display shown in FIG. 2, and illustrating alignment conditions of the liquid crystal molecules when a power is turned off (a) and when a power is turned on (b)

FIG. 5(a) and FIG. 5(b) are cross sectional views which are obtained by simplifying the cross sectional view of the OCB type liquid crystal display shown in FIG. 2, and which illustrates alignment condition of the liquid crystal molecules 21 when a power is turned off and when a power is turned on, respectively. In portions of the liquid crystal layer 8 which are interposed between the slant surfaces of the insulating films 11 in the transition nucleus areas 22, the liquid crystal molecules 21 are bend aligned both in a power on condition and in a power off condition. However, in a portion of the liquid crystal layer 8 where the pixel electrode 12 is formed, the liquid crystal molecules 21 are splay aligned in the power off condition, and are bend aligned in the power on condition.

Here, the power off condition means a condition in which no voltage difference exists between the pixel electrode 12 and the common electrode 18. The power on condition is a condition in which a voltage difference of approximately 3–5 volts exists between the pixel electrode 12 and the common electrode 18. In case the voltage difference is approximately 3–5 volts, it is possible to apply such voltage by using the TFT 10. Since the transition from splay alignment to bend alignment occurs immediately by the voltage which can be applied by using the TFT 10, it can be seen that the liquid crystal molecules 21 in the transition nucleus areas 22 which are bend aligned in the initial condition can function as nuclei of the transition. With respect to a driving method of the liquid crystal layer 8 for performing white and black image display after the liquid crystal layer 8 in the area of the pixel electrode 12 becomes bend aligned, it is possible to adopt a driving method used in a conventional OCB type liquid crystal display.

Figure 6:
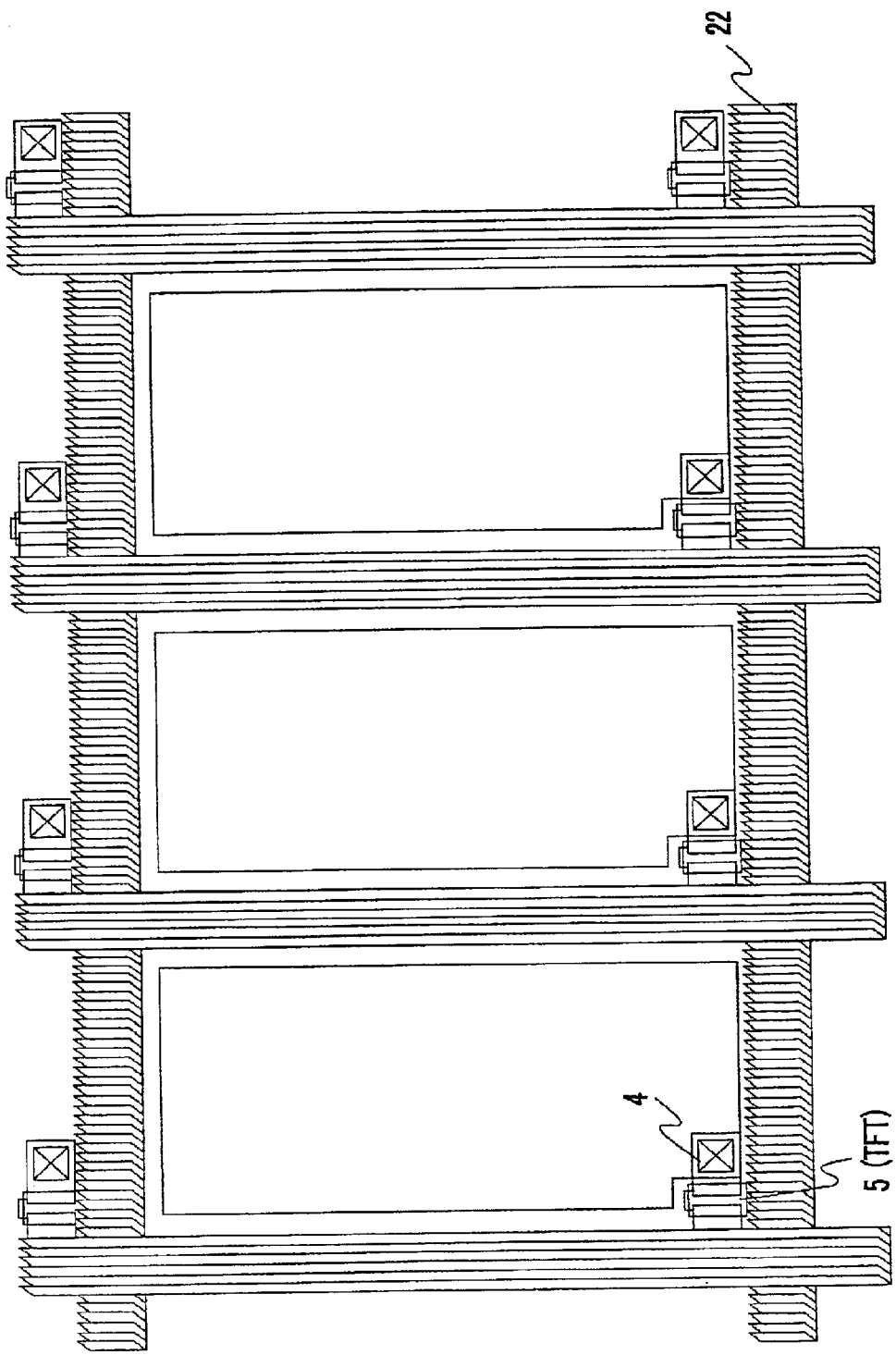
FIG. 6 is a plan view showing in which portion around the pixel electrodes the transition nucleus area is formed.

FIG. 6 is a plan view showing in which portion around the pixel electrodes the transition nucleus area 22 is formed. As shown in FIG. 6, the slant surfaces are formed in the insulating film 11 as the transition nucleus area 22, in an area where the gate lines 2 and the drain lines 3 are formed as shown in FIG. 1. The slant surfaces of the insulating film 11 are not formed in areas where the pixel electrodes 1 are formed. Therefore, alignment of liquid crystal molecules 21 in the areas of the pixel electrodes 1 is not disturbed, and light leakage in a black image display condition does not occur. Also, by making the angle of the slant surfaces in the transition nucleus area 22 with respect to the substrate equal to or larger than 45 degrees, it is possible to realize a stable bend alignment condition.

With reference to FIG. 7A through FIG. 7H, an explanation will now be made on a method of manufacturing the OCB type liquid crystal display which is illustrated in FIG. 1 through FIG. 6 according to the present invention.

Figure 7A:
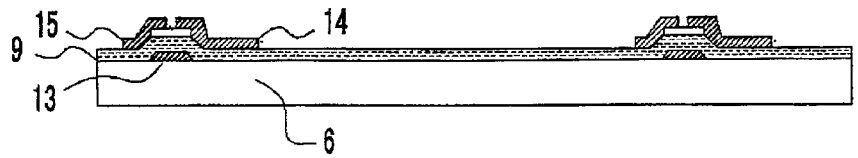
FIG. 7A through FIG. 7H are cross sectional views each illustrating a structure of a workpiece obtained during a process of manufacturing an OCB type liquid crystal display by using a manufacturing method according to the present invention.

First, gate electrodes 13 are formed on a lower side substrate 6, and a gate insulating film 9 is stacked on the gate electrodes 13 and lower side substrate 6. A source electrode 14 and drain electrode 15 are formed on the gate insulating film 9, and thereby an active matrix substrate having TFT's 10 as switching elements is formed, as shown in FIG. 7A. Here, it should be noted that the switching element is not limited to the TFT, but the switching element may be constituted of other switching element, for example, a diode and the like.

Figure 7B:
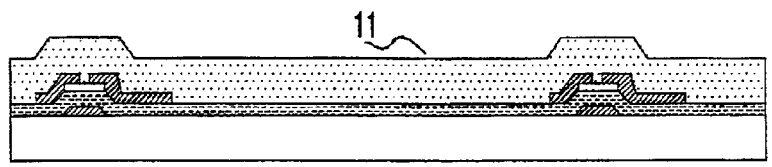
Figure 7C:
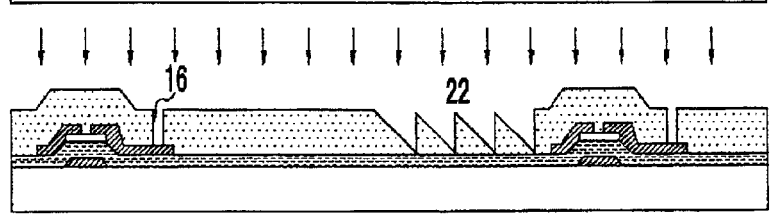

Thereafter, an insulating film 11 which is made of photosensitive acrylic resin is formed on the TFT's 10 and the gate insulating film 9, and a structure shown in FIG. 7B is obtained. Then, the insulating film 11 is masked by using a mask having a predetermined pattern, and the insulating film 11 is exposed and developed. Thereby, contact holes 16 reaching the source electrodes 14 and slant surfaces of transition nucleus area 22 having a saw-tooth profile are formed at predetermined locations of the insulating film 11, as shown in FIG. 7C. In this case, the slant surfaces of the transition nucleus area 22 are formed by using a mask having gradation in which light transmission varies continuously or stepwise, for example, from 0 to 100% As another way, while stepwise moving a mask having a slit, an exposure light intensity is varied, i.e., increased or decreased, every step.

Figure 7D:
Figure 7E:
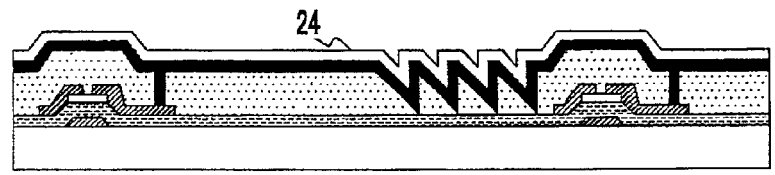
Figure 7F:
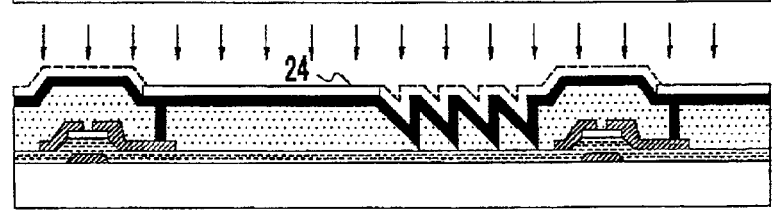

By using a sputtering method, an ITO film 23 for forming pixel electrodes 12 is stacked on whole area of the insulating film 11. In this case, the material of the ITO film also fills the contact holes 16. Thereby, the source electrodes 14 and the pixel electrodes 12 are electrically coupled together, as shown in FIG. 7D. Here, it is assumed that the OCB type liquid crystal display in this explanation is a transmission type liquid crystal display. Therefore, the pixel electrodes 12 are made of the ITO film 23 which is transparent. However, in case a reflection type liquid crystal display is to be manufactured, it is possible to form the pixel electrodes 12 by using a metal such as aluminum and the like. After stacking the ITO film 23, a photo resist film 24 is applied on the ITO film 23 by spin coating, as shown in FIG. 7E. The photo resist film 24 is masked by using a mask having a predetermined pattern, and exposed and developed. Thereby, portions of the photo resist film 24 where the pixel electrodes 12 are to be formed are left unresolved, as shown in FIG. 7F.

Figure 7G:
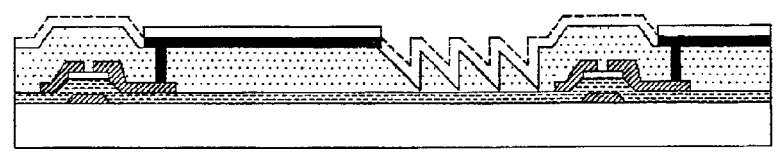
Figure 7H:
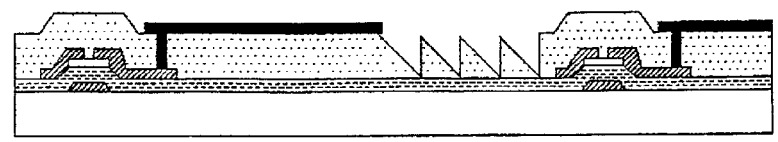

The ITO film 23 is etched by using the patterned photo resist film 24 as a mask, and thereby the pixel electrodes 12 are remained and other portions of the ITO film 23 are removed, as shown in FIG. 7G. The photo resist film 24 is then removed, and the active matrix substrate of the OCB type liquid crystal display shown in FIG. 2 is obtained, as shown in FIG. 7H. In this case, etching of the ITO film 23 and removal of the photo resist film 24 can be done by using any method depending on the kinds of the pixel electrodes 12 and the photo resist film 24. It is possible to use a convenient technology which is conventionally provided and used. Although not described in detail here, an alignment film 17 for determining alignment direction of the liquid crystal molecules 21 is formed on the pixel electrodes 12 and the insulating film 11 and the alignment film 17 is rubbed, by using a technology similar to the conventional technology.

On the opposing side substrate 7, the color filter 19 and the light shield film 20 are formed by etching and the like. Then, the common electrode 18 and the insulating film 11 which is made of photosensitive acrylic resin are formed in order. Thereafter, in a manner similar to the method mentioned above with reference to FIG. 7C, the insulating film 11 is masked, and exposure and development processes are performed. Thereby, the slant surfaces having a saw-tooth profile of the transition nucleus area 22 are formed at predetermined locations of the insulating film 11. In this case, the slant surfaces of the transition nucleus area 22 are formed by using a mask having gradation in which light transmission varies continuously or stepwise, for example, from 0 to 100%. As another way, while stepwise moving a mask having a slit, an exposure light intensity is varied, i.e., increased or decreased, every step. Also, an alignment film 17 for determining alignment direction of the liquid crystal molecules 21 is formed on the pixel electrodes 12 and the insulating film 11 and the alignment film 17 is rubbed, by using a technology similar to the conventional technology.

Figure 13:
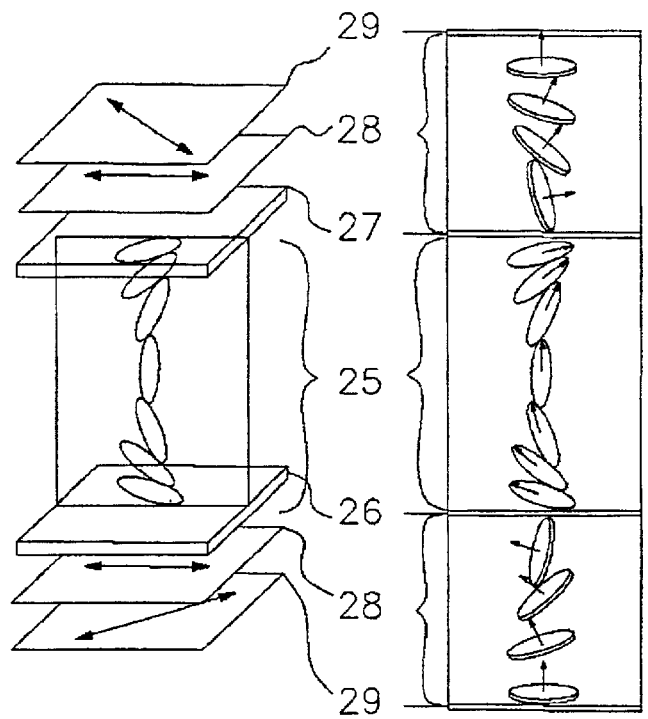
FIG. 13 shows an example of a basic structure of an OCB type liquid crystal display.
Figure 14:
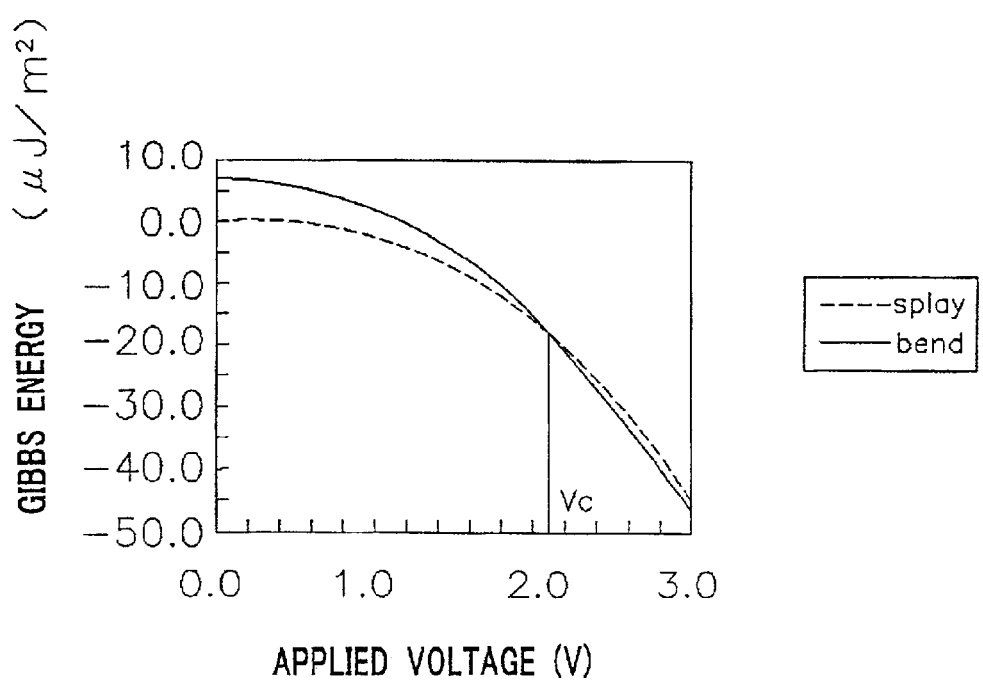
FIG. 14 is a graph showing an example of calculation of Gibbs energy with respect to applied voltages.

The lower side substrate 6 and the opposing side substrate 7 fabricated by the methods mentioned above are opposed and assembled together via a frame member not shown in the drawing. The gap between both substrates is filled with liquid crystal molecules 21 and thereby the OCB type liquid crystal display shown in FIG. 2 is fabricated. The OCB type liquid crystal display fabricated in this way is put between two polarizer films and two negative birefringence compensation boards composed by using discotic liquid crystal, similarly to the conventional OCB type liquid crystal display shown in FIG. 13.

[Embodiment 2]

Figure 8:
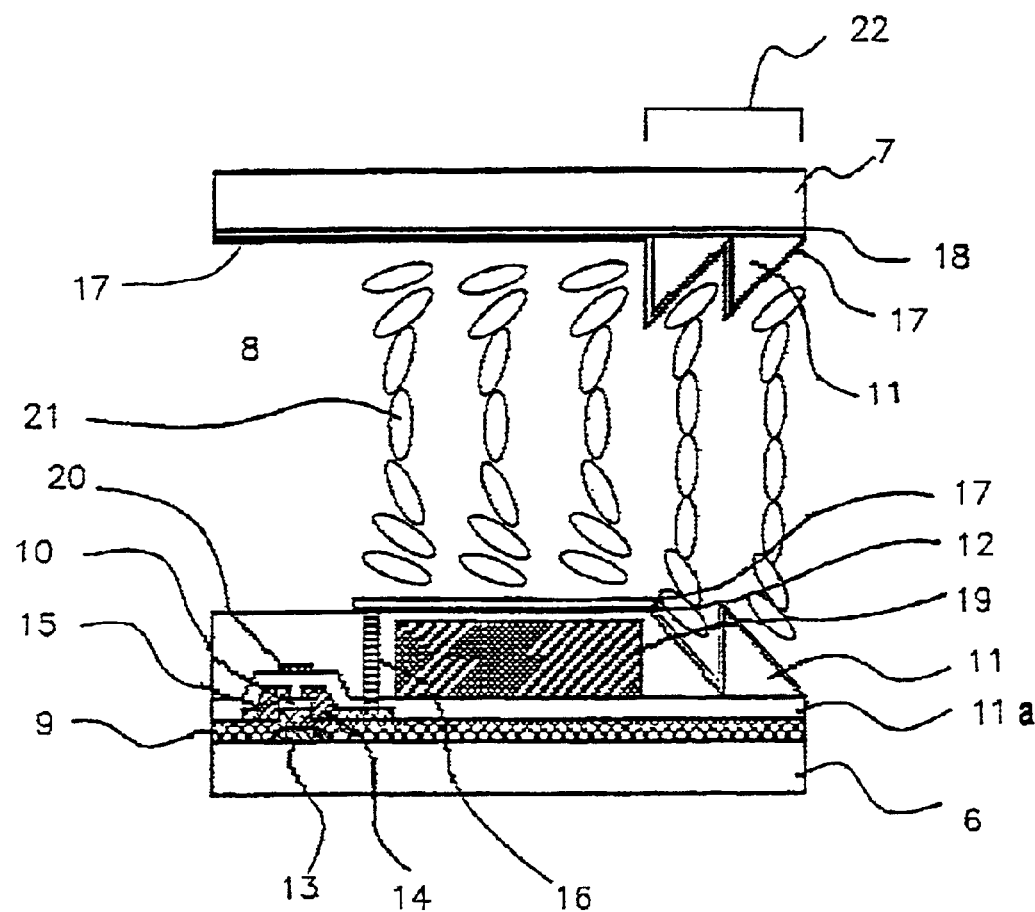
FIG. 8 is a partial schematic cross sectional view of a pixel portion of an OCB type liquid crystal display according to a second embodiment of the present invention.

FIG. 8 is a partial schematic cross sectional view of a pixel portion of an OCB type liquid crystal display according to a second embodiment of the present invention. FIG. 8 is a cross sectional view approximately taken along the line A—A in FIG. 1. As shown in FIG. 8, the OCB type liquid crystal display according to the present embodiment comprises a lower side substrate 6, an opposing side substrate 7 which is disposed on the opposite side of the lower side substrate 6, and a liquid crystal layer 8 interposed between the lower side substrate 6 and the opposing side substrate 7. The thickness of the liquid crystal layer 8 is 5–6 $\mu$m. On the lower side substrate 6, there are disposed a gate insulating film 9, a TFT 10, an insulating film 11, a pixel electrode 12, a color filter 19 and a light shield film 20. More particularly, on the lower side substrate 6, there is stacked the gate insulating film 9 which is made of photosensitive acrylic resin. On the gate insulating film 9, the TFT 10 is formed. The TFT 10 has a gate electrode 13 formed on the lower side substrate 6, and a source electrode 14 and a drain electrode 15 which are formed on the gate insulating film 9 covering the gate electrode 13. The gate electrode 13 is electrically coupled with the gate line 2 shown in FIG. 1, and the drain electrode 15 is electrically coupled with the drain line 3 shown in FIG. 1.

On the gate insulating film 9 and the TFT 10, an overcoat film 11a and the insulating film 11 are stacked, and the overcoat film 11a and the insulating film 11 have a contact hole 16 which reaches the source electrode 14. Also, the pixel electrode 12 is formed to cover the overcoat film 11a, the insulating film 11 and the contact hole 16. Therefore, the pixel electrode 12 is electrically coupled with the source electrode 14 of the TFT 10, and functions as an electrode for applying a voltage to the liquid crystal layer 8. The color filter 19 is made of transparent resin which is colored red (R), green (G) and blue (B). The light shield film 20 is a black mask which is formed at locations corresponding to the TFT 10, the gate line 2 and drain line 3 of the lower side substrate 6, and functions to avoid transmission of light at these areas.

The opposing side substrate 7 has an alignment film 17, an insulating film 11, a common electrode 18, and a light shield film 20 which are stacked on the opposing side substrate 7 in this order from the side of the liquid crystal layer 8. The light shield film 20 is formed such that it covers the transition nucleus area 22. Although not shown in the drawing, it is also possible to form the light shield film 20 at the insulating film 11 on the side of the lower side substrate 6. The alignment film 17 is a film for determining the alignment direction of liquid crystal molecules 21 in the liquid crystal layer 8 by rubbing the surface of the alignment film 17. The common electrode 18 functions as an electrode which, together with the pixel electrodes 12, applies a voltage to the liquid crystal layer 8.

In the insulating films 11 stacked on the lower side substrate 6 and on the opposing side substrate 7, slant surfaces are continuously formed which have saw tooth like cross sections, in the transition nucleus areas 22. At the slant surfaces of the insulating film 11 in the transition nucleus areas 22, the pretilt angle and alignment direction of the liquid crystal molecules 21 are also determined by various factors. Such factors include, for example, an angle of the slant surface with respect to the substrate, rubbing direction, a material of the insulating film 11 and the like. When resin having a small pretilt angle is used as a material of the insulating film 11, long axes of liquid crystal molecules 21 are aligned approximately parallel to the surface of the insulating film 11 in the area near the insulating film 11. Therefore, as shown in FIG. 8, in the condition the lower side substrate 6 and the opposing side substrate 7 are opposed to each other, when the slant surfaces of the insulating films 11 opposing to each other incline toward mutually opposite angular directions with respect to a hypothetical plane parallel to the substrates and passing through the liquid crystal layer 8, liquid crystal molecules located in the transition nucleus area 22 are always bend aligned, because the liquid crystal molecules 21 are continuum medium.

The OCB type liquid crystal display shown in FIG. 8 can be manufactured by a method similar to the method of manufacturing the OCB type liquid crystal display according to the first embodiment shown in FIGS. 7A–7H, except for the following. That is, when fabricating the OCB type liquid crystal display shown in FIG. 8, after forming an overcoat film 11a on TFT's 10 and gate insulating films 9 as shown in FIG. 7A, a light shield film 20 is formed so as to superpose it on TFT's 10, and a color filter 19 is formed on the overcoat film 11a at areas corresponding to pixel electrodes 12. Process steps thereafter concerning the insulating film 11, the pixel electrodes 12, contact holes 16 and slant surfaces of the transition nucleus area 22 having a saw-tooth profile may be the same as those described with reference to FIG. 7B through FIG. 7H.

[Embodiment 3]

With reference to FIGS. 9A–9G and FIGS. 10A–10F, an explanation will now be made on another method of manufacturing an active matrix substrate used in the OCB type liquid crystal display according to the present invention. A process for fabricating portions of the OCB type liquid crystal display other than the active matrix substrate may be the same as that described with reference to the first embodiment.

Figure 9A:
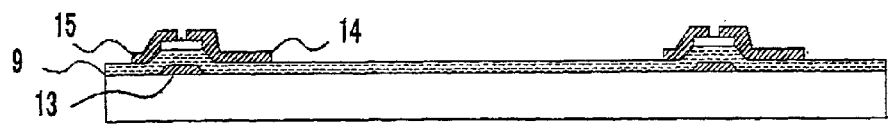
FIG. 9A through FIG. 9G are cross sectional views each illustrating a structure of a workpiece obtained during a process of manufacturing an OCB type liquid crystal display by using another manufacturing method according to the present invention.

First, gate electrodes 13 are formed on a lower side substrate 6, and a gate insulating film 9 is stacked on the gate electrodes 13 and lower side substrate 6. Source electrodes 14 and drain electrodes 15 are formed on the gate insulating film 9, and thereby an active matrix substrate having TFT's 10 as switching elements is formed, as shown in FIG. 9A. Here, it should be noted that each of the switching elements is not limited to the TFT, but may be constituted of other switching element, for example, a diode and the like.

Figure 9B:
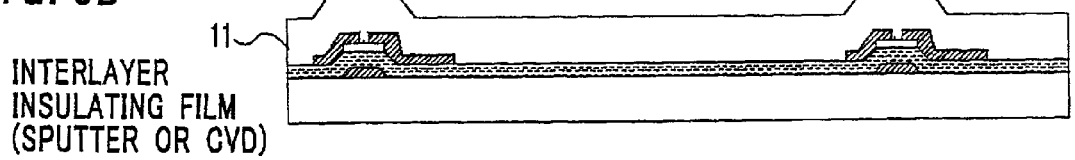
Figure 9C:
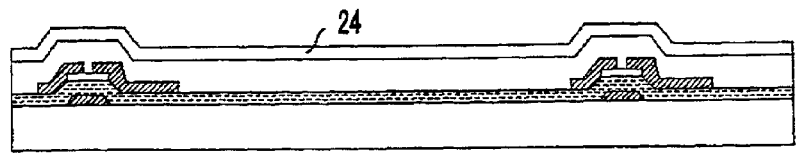
Figure 9D:
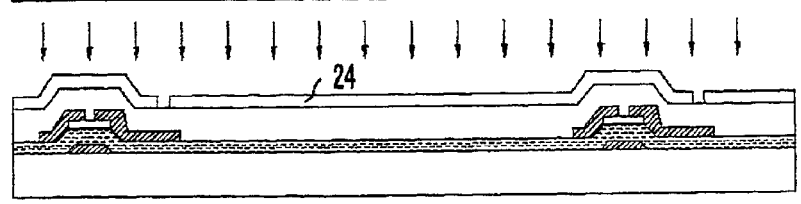
Figure 9E:
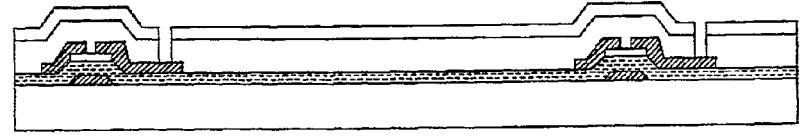
Figure 9F:
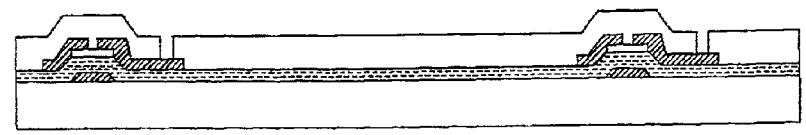
Figure 9G:
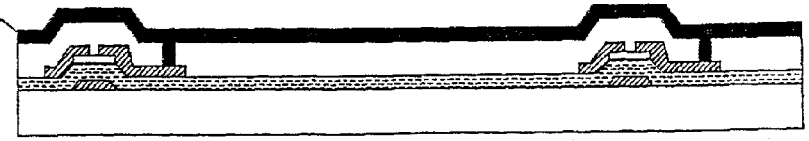

Thereafter, an insulating film 11 which is made of $SiO_2$ and the like is formed on the TFT's 10 and the gate insulating film 9 by using a sputtering method or a CVD method, and a structure shown in FIG. 9B is obtained. Then, a photo resist film 24 is applied on the insulating film 11 by spin coating, as shown in FIG. 9C. The photo resist film 24 is masked by using a mask having a predetermined pattern, and is exposed and developed, as shown in FIG. 9D. Then, by etching, contact holes 16 reaching the source electrodes 14 are formed, as shown in FIG. 9E. After removing the photo resist film 24 as shown in FIG. 9F, an ITO film 23 for forming pixel electrodes 12 is stacked on whole area of the insulating film 11 by using a sputtering method. In this case, the material of the ITO film 23 also fills the inside of the contact holes 16. Thereby, the source electrodes 14 and the pixel electrodes 12 are electrically coupled together, as shown in FIG. 9G.

Figure 10A:
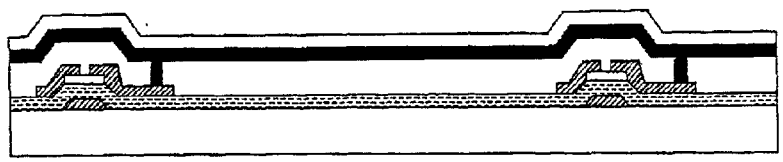
FIG. 10A through FIG. 10F are cross sectional views each illustrating a structure of a workpiece obtained, after the structure of FIG. 9G, during a process of manufacturing an OCB type liquid crystal display by using another manufacturing method according to the present invention.
Figure 10B:
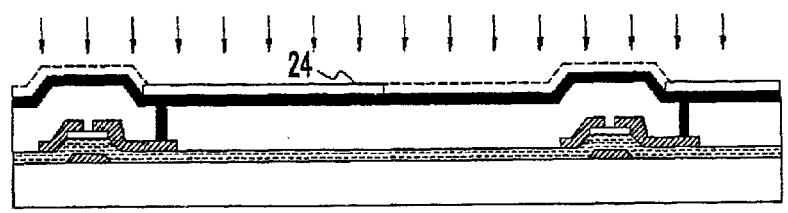

After stacking the ITO film 23, a photo resist film 24 is again applied on the ITO film 23 by spin coating, as shown in FIG. 10A. The photo resist film 24 is masked by using a mask having a predetermined pattern, and exposed and developed. Thereby, portions of the photo resist film 24 where the pixel electrodes 12 are to be formed are left unresolved, as shown in FIG. 10B.

Figure 10C:
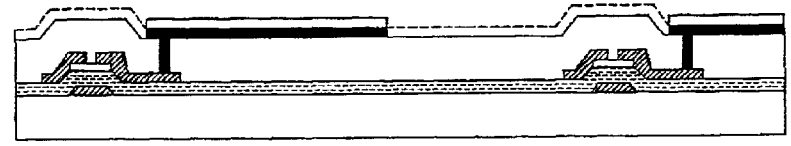
Figure 10D:
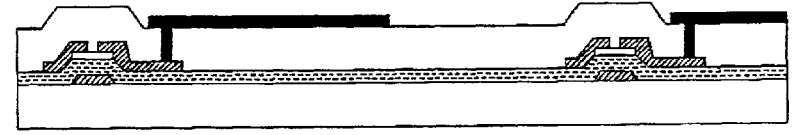
Figure 10E:
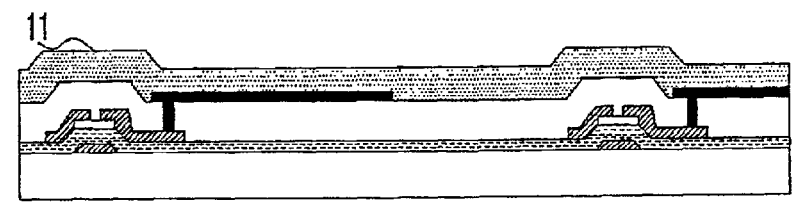
Figure 10F:
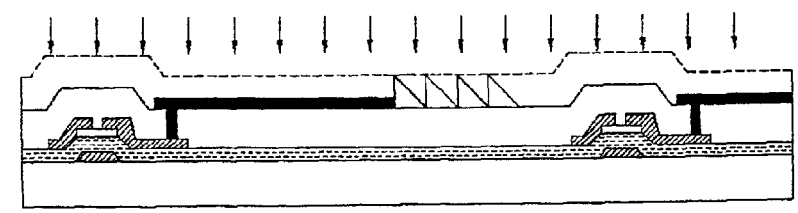

Thereafter, the ITO film 23 is etched by using the patterned photo resist film 24 as a mask, and thereby the pixel electrodes 12 are remained and other portions of the ITO film 23 are removed, as shown in FIG. 10C. The photo resist film 24 is then removed, and the pixel electrodes 12 are formed, as shown in FIG. 10D. Thereafter, an insulating film 11 made of photosensitive acrylic resin is stacked by spin coating, as shown in FIG. 10E. The insulating film 11 is masked by using a mask having a predetermined pattern, and exposed and developed. Thereby, the slant surfaces having a saw-tooth profile of the transition nucleus area 22 are formed at predetermined locations of the insulating film 11, as shown in FIG. 10F. In this case, the slant surfaces of the transition nucleus area 22 are formed, for example, by using a mask having gradation in which light transmission varies continuously or stepwise, for example, from 0 to 100%.

In this case, etching of the ITO film 23 and removal of the photo resist film 24 can be done by using any method depending on the kinds of the pixel electrodes 12 and the photo resist film 24. It is possible to use a convenient technology which is conventionally provided and used. Also, although not shown in the drawing, an alignment film for determining alignment direction of the liquid crystal molecules 21 is formed on the pixel electrodes 12 and the insulating film 11 and the alignment film is rubbed, by using a technology similar to the conventional technology.

[Embodiments 4 and 5]

Figure 11:
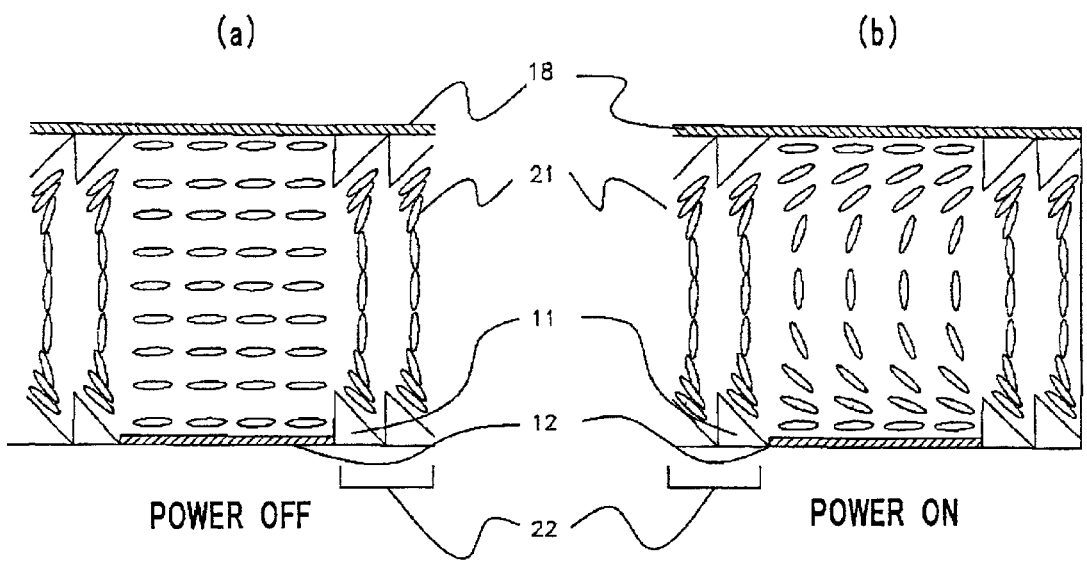
FIG. 11 includes cross sectional views obtained by simplifying the cross sectional view of an OCB type liquid crystal display according to another embodiment of the present invention, and illustrating alignment conditions of liquid crystal molecules when a power is turned off (a) and when a power is turned on (b)
Figure 12:
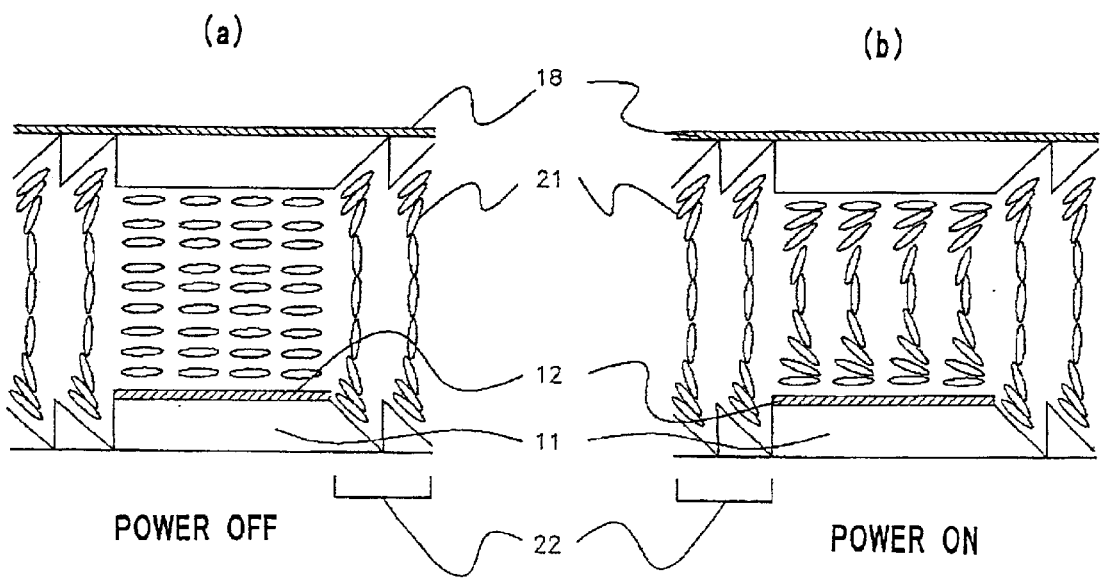
FIG. 12 includes cross sectional views obtained by simplifying the cross sectional view of an OCB type liquid crystal display according to still another embodiment of the present invention, and illustrating alignment conditions of liquid crystal molecules when a power is turned off (a) and when a power is turned on (b)

FIG. 11 and FIG. 12 are schematic cross sectional views illustrating OCB type liquid crystal displays as other embodiments (embodiments 4 and 5) of the present invention. In the OCB type liquid crystal displays according to these embodiments, condition of the step height difference between an area where each pixel electrode 12 is formed and a transition nucleus area 22 differs from that of the previous embodiments. In the structure shown in FIG. 11, the slant surfaces of the transition nucleus area 22 project toward the liquid crystal layer 8 than the surface of the pixel electrode 12. Even in this structure, the liquid crystal molecules 21 in the pixel area become splay aligned in a power off condition, and become bend aligned in a power on condition. Further, whether or not there exists such step height difference on the side of the common electrode 18, the liquid crystal molecules 21 in the pixel area become splay aligned in a power off condition, and become bend aligned in a power on condition.

Here, the power off condition means a condition in which no voltage difference exists between the pixel electrode 12 and the common electrode 18. The power on condition is a condition in which a voltage difference of approximately 3–5 volts exists between the pixel electrode 12 and the common electrode 18. It is possible to produce the voltage difference of approximately 3–5 volts by using the TFT 10. Since the transition from splay alignment to bend alignment occurs immediately by the voltage which can be applied by using the TFT 10, it can be seen that the liquid crystal molecules 21 in the transition nucleus area 22 which are bend aligned in the initial condition can function as nuclei of the transition. With respect to a driving method of the liquid crystal layer 8 for performing white and black image display after the liquid crystal layer 8 in the area of the pixel electrode 12 becomes bend aligned, it is possible to adopt a driving method used in a conventional OCB type liquid crystal display.

Figure 15:
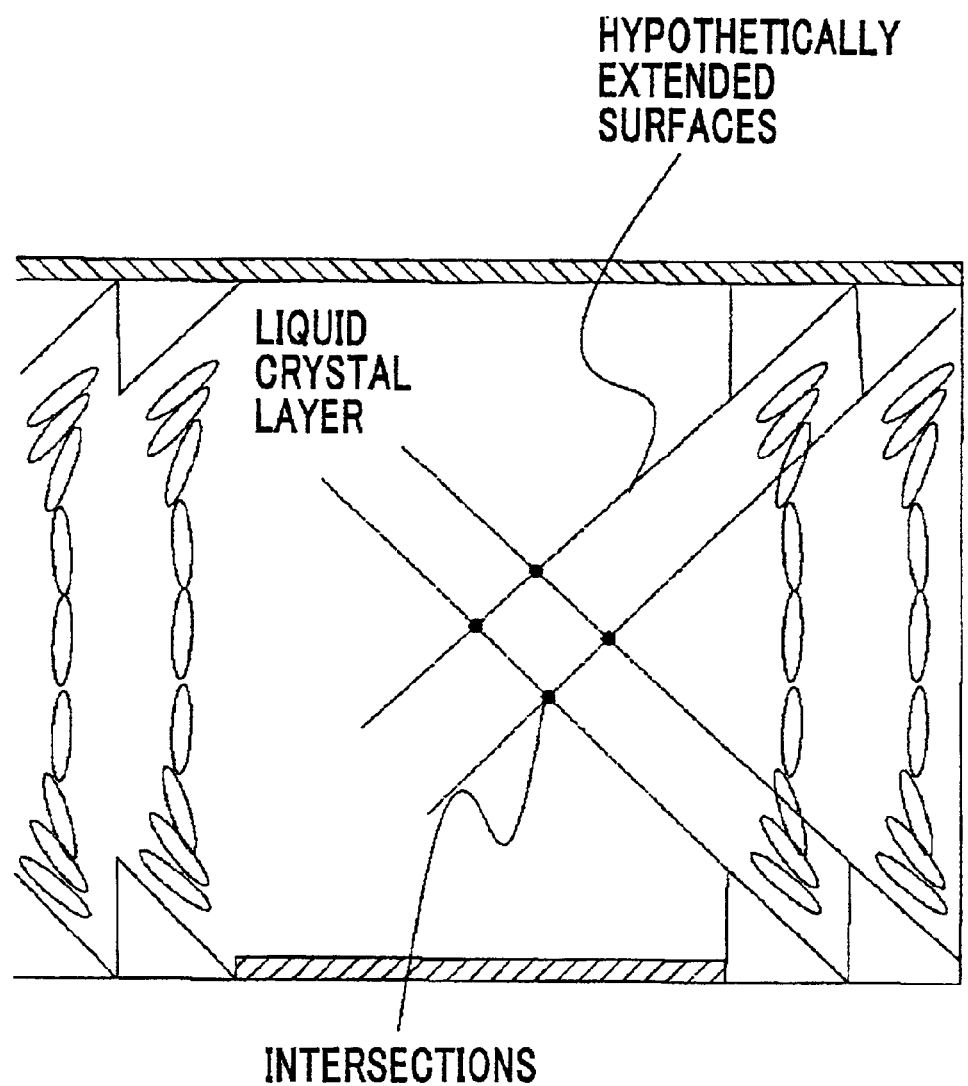
FIG. 15 is schematic view illustrating a condition in which hypothetical planes extended from slant surfaces of a transition nucleus area intersect within the liquid crystal layer in an OCB type liquid crystal display according to the present invention.

In the OCB type liquid crystal display according to the present invention, it is preferable that hypothetical planes extended from the slant surfaces of the transition nucleus areas 22 of the lower side substrate 6 and of the opposing side substrate 7 intersect within the liquid crystal layer 8. FIG. 15 schematically illustrates this condition in which both the extended hypothetical planes intersect within the liquid crystal layer 8. Thereby, liquid crystal molecules located in the transition nucleus areas become a bend aligned condition even when no voltage is applied between both substrates, and when a voltage is applied between both substrates, transition occurs easily from splay alignment to bend alignment in the pixel area.

In summary, according to the present invention, in the above-mentioned OCB type liquid crystal display, slant surfaces of transition nucleus areas are formed on both substrates opposing to each other such that the slant surfaces on both substrates opposing to each other incline toward opposite angular directions. Therefore, a portion of a liquid crystal layer located between the transition nucleus areas is initially bend aligned, and when a voltage is applied between both substrates, transition occurs easily from splay alignment to bend alignment.

When the slant surfaces of the transition nucleus areas are formed in areas other than pixel electrode areas, disturbance of alignment of liquid crystal molecules does not occur in a display area, and, therefore, deterioration of light transmission does not occur easily.

The transition nucleus areas may be formed in areas where the scanning signal electrodes/the image signal electrodes are formed. Thereby, portions of the liquid crystal layer located in the transition nucleuss area are covered by a black matrix portion, and it becomes possible to improve display quality of the liquid crystal display.

The transition nucleus area on the side of the lower side substrate and the transition nucleus area on the side of the opposing side substrate are formed at locations which approximately oppose to each other. Thereby, disturbance of alignment of liquid crystal molecules in the transition nucleus areas is decreased and display quality of the liquid crystal display can be improved.

The slant surfaces of the transition nucleus areas are inclined toward uniform direction(s) throughout the whole display area. Therefore, it is possible to unify alignment directions of liquid crystal molecules of all pixels, and it becomes possible to effectively and uniformly align liquid crystal layer of the whole display area.

The liquid crystal molecules in the transition nucleus areas are bend aligned, even in a condition no voltage is applied between both substrates. Thereby, liquid crystal molecules in other portions of the liquid crystal layer which are splay aligned in a condition no voltage is applied are induced to become bend aligned by the bend alignment condition in the transition nucleus areas when a voltage is applied between both substrates. Therefore, it becomes possible to easily produce and stably maintain the bend alignment condition in the liquid crystal layer even when a relatively low voltage is applied between both substrates, and even when the surfaces of the transition nucleus areas are recessed or projected from the pixel electrode and/or common electrode.

Depending on the angle of the slant surface of each transition nucleus area with respect to the substrate, the liquid crystal molecules disposed at the transition nucleus area can become bend aligned. Therefore, even when the pretilt angle of the substrate surface of each of the transition nucleus areas is zero (0) degree or very small, it is possible to maintain bend alignment. Thus, it is possible to use a material having a small pretilt angle in the interface portion with the liquid crystal layer, and it becomes possible to easily select the material from a point of view of costs thereof.

When manufacturing the OCB type liquid crystal display according to the present invention, it is possible to perform an exposure and development process by using a mask having gradation portions each of which has a light transmittance that varies continuously. Also, it is possible to perform an exposure and development process by increasing/decreasing an exposure light intensity, while transporting a mask having a slit stepwise. Thereby, it becomes possible to form the slant surfaces of the transition nucleus areas. Therefore, it is possible to provide a liquid crystal display according to the present invention without increasing manufacturing process steps thereof.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A liquid crystal display comprising:
   first and second substrates which are opposed to each other via a liquid crystal layer interposed therebetween, wherein rubbing directions of the first and second substrates being parallel to each other;
   a plurality of pixel electrodes which correspond to respective pixels;
   a common electrode formed on the second substrate which receives a reference voltage commonly to a plurality of the pixels;
   a first transition nucleus area which is formed on the surface of the first substrate on the side of the liquid crystal layer and which comprises a plurality of continuous slant surfaces having a saw-tooth cross sectional profile; and
   a second transition nucleus area which is formed on the surface of the second substrate on the side of the liquid crystal layer and which comprises a plurality of continuous slant surfaces having a saw-tooth cross sectional profile;
   wherein the slant surfaces in the first transition nucleus area and the slant surfaces in the second transition nucleus areas oppose to each other and slope toward mutually opposite angular directions.

2. A liquid crystal display as set forth in claim 1, wherein a hypothetical plane extended from the slant surface of the transition nucleus area of the first substrate and a hypothetical plane extended from the slant surface of the transition nucleus area of the second substrate intersect within the liquid crystal layer.

3. A liquid crystal display as set forth in claim 1, wherein the first transition nucleus area is formed in a non-display area other than the pixel areas of the first substrate.

4. A liquid crystal display as set forth in claim 3, wherein the non-display area is an area where the scanning signal line and/or the image signal line are formed.

5. A liquid crystal display as set forth in claim 3, wherein a light shield layer is formed in an area of the second substrate opposing to the non-display area, thereby the non-display area is covered by the light shield layer.

6. A liquid crystal display as set forth in claim 1, wherein the second transition nucleus area formed on the side of the second substrate is formed at approximately the same area as that corresponding to the first transition nucleus area formed on the side of the second substrate.

7. A liquid crystal display as set forth in claim 1, wherein the slant surfaces of the first transition nucleus area and the slant surfaces of the second transition nucleus area are formed in a uniform direction throughout the whole display area.

8. A liquid crystal display as set forth in claim 1, wherein, because of the slant surfaces of the first transition nucleus area and of the second transition nucleus area, liquid crystal molecules in the transition nucleus areas have substantially high pretilt angle, and, even in a condition no voltage difference exists between the pixel electrodes and the common electrode, liquid crystal molecules of the liquid crystal layer in the transition nucleus areas have bend alignment.

9. A liquid crystal display as set forth in claim 1, wherein an angle between the slant surfaces of the first transition nucleus area and the first substrate and an angle between the slant surfaces of the second transition nucleus area and the second substrate are respectively equal to or larger than 45 degrees, and a ratio of elastic constants k33/k11 between an elastic constant of bend alignment and an elastic constant of splay alignment is equal to or smaller than 1 (one).

10. A liquid crystal display as set forth in claim 1, wherein an angle between the slant surfaces of the first transition nucleus area and the first substrate and an angle between the slant surfaces of the second transition nucleus area and the second substrate are respectively equal to or larger than 60 degrees.

11. A liquid crystal display as set forth in claim 1, wherein the slopes of the slant surfaces of the first transition nucleus area and the second transition nucleus area substantially coincides with the alignment direction of liquid crystal molecules at respective interfaces between the first substrate and the liquid crystal layer and between the second substrate and the liquid crystal layer.

12. A liquid crystal display as set forth in claim 1, further comprising:
   a plurality of scanning signal lines disposed on the first substrate;
   a plurality of image signal lines which are disposed on the first substrate and which intersect the scanning signal lines; and
   a plurality of thin film transistors which are formed in the proximity of respective intersections between the scanning signal lines and the image signal lines;
   wherein each of the plurality of pixel electrodes is formed in correspondence with one of areas surrounded by the scanning signal lines and the image signal lines and is coupled with respective one of the thin film transistors.

13. A method of driving a liquid crystal display having first and second substrates which are opposed to each other via a liquid crystal layer interposed therebetween, a plurality of pixel electrodes which correspond to respective pixels, and a common electrode formed on the second substrate which receives a reference voltage commonly to a plurality of the pixels, the method comprising:
   providing a transition nucleus area in a non-display area in the periphery of the pixel electrodes, and making the liquid crystal layer in the transition nucleus area bend aligned in a condition no voltage is applied between the pixel electrodes and the common electrode; and switching the liquid crystal layer in the display area of each pixel from a splay alignment condition to a bend alignment condition, by applying a voltage between the pixel electrode in the pixel and the common electrode,
   wherein the transition nucleus area comprises a first transition nucleus area which is formed on the surface of the first substrate on the side of the liquid crystal layer and which comprises a plurality of continuous slant surfaces having a saw-tooth cross sectional profile, and a second transition nucleus area which is formed on the surface of the second substrate on the side of the liquid crystal layer and which comprises a plurality of continuous slant surfaces having a saw-tooth cross sectional profile; and wherein the slant surfaces in the first transition nucleus area and the slant surfaces in the second transition nucleus area oppose to each other and slope toward mutually opposite angular directions.

14. A method of driving a liquid crystal display as set forth in claim 13, wherein an angle between the slant surfaces of the first transition nucleus area and the first substrate and an angle between the slant surfaces of the second transition nucleus area and the second substrate are respectively equal to or larger than 45 degrees, and a ratio of elastic constants k33/k11 between an elastic constant of bend alignment and an elastic constant of splay alignment is equal to or smaller than 1 (one).

15. A method of driving a liquid crystal display as set forth in claim 13, wherein an angle between the slant surfaces of the first transition nucleus area and the first substrate and an angle between the slant surfaces of the second transition nucleus area and the second substrate are respectively equal to or larger than 60 degrees.

* * * * *